information of United States Patent

(12) United States Patent
Avraham et al.

(10) Patent No.: US 11,853,564 B1
(45) Date of Patent: Dec. 26, 2023

(54) KEY VALUE DATA STORAGE DEVICE WITH IMPROVED UTILIZATION FOR SHORT KEY VALUE PAIRS

(71) Applicant: Western Digital Technologies, Inc., San Jose, CA (US)

(72) Inventors: David Avraham, Even Yehuda (IL); Alexander Bazarsky, Holon (IL); Ran Zamir, Ramat Gan (IL)

(73) Assignee: Western Digital Technologies, Inc., San Jose, CA (US)

( * ) Notice: Subject to any disclaimer, the term of this patent is extended or adjusted under 35 U.S.C. 154(b) by 19 days.

(21) Appl. No.: 17/843,675

(22) Filed: Jun. 17, 2022

(51) Int. Cl.
*G06F 12/00* (2006.01)
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
CPC ..... G06F 3/0622; G06F 3/0655; G06F 3/0679
See application file for complete search history.

(56) References Cited

U.S. PATENT DOCUMENTS

2020/0301850 A1* 9/2020 Qiu .................. G06F 3/0679
2021/0216448 A1* 7/2021 Chen ................ G06F 3/0679
2023/0016020 A1* 1/2023 Kim ................. G06F 3/0604

FOREIGN PATENT DOCUMENTS

CN    110069539 A  *  7/2019  ....... G06F 16/24578
CN    112800303 A  *  5/2021  ........... G06F 16/951

OTHER PUBLICATIONS

Machine Translation of Chinese patent CN110069539A (Year: 2019).*
Machine translation of Chinese patent CN112800303A (Year: 2021).*
Kim, et al., The Key to Value: Understanding the NVMe Key-Value Standard, Live Website, Sep. 1, 2020, SNIA NSF, Networking Storage, 31 pp.
Adams, NVMe®Base Specification 2.0 Preview, Flash Memory Summit, 2020, NVM Express organization, 20 pp.
Samsung Key Value SSD Enables High Performance Scaling, A Technology Brief by Samsung Memory Solutions Lab, Samsung Electronics, Co. Ltd., 2017, 8 pp.
Martin, et al., NVM Express Technical Proposal for New Feature, Jun. 2020, NVM Express, Inc., 34 pp.

* cited by examiner

*Primary Examiner* — John A Lane
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to receive key value (KV) pair data from a host device, where the KV pair data includes a key and a value, store the received KV pair data in an intermediate storage location, match the received KV pair data to another one or more KV pair data stored in the intermediate storage location, where the matching is based on a utilization parameter of a storage container of the memory device, aggregate the matched received KV pair data and the another one or more KV pair data stored in the intermediate storage location, and program the aggregated KV pair data to the memory device.

20 Claims, 7 Drawing Sheets

| | VALUE TYPE A (1) 404 | PADDING 412 |
|---|---|---|
| FMU 1 402a | | |
| FMU 2 402a | VALUE TYPE A (2) 406 | PADDING 412 |
| FMU 3 402a | VALUE TYPE B (1) 408 | VALUE TYPE B (2) 410 | PADDING 412 |

| | VALUE TYPE A (1) 704 | VALUE TYPE B (1) 708 |
|---|---|---|
| FMU 1 702a | | |
| FMU 2 702a | VALUE TYPE A (2) 706 | VALUE TYPE B (2) 710 |

KEY VALUE DATA STORAGE DEVICE WITH IMPROVED UTILIZATION FOR SHORT KEY VALUE PAIRS

BACKGROUND OF THE DISCLOSURE

Field of the Disclosure

Embodiments of the present disclosure generally relate to data storage devices, such as solid state drives (SSDs), and, more specifically, optimization of storage of data in key value (KV) data storage devices.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. KV pair data allows access to data on a data storage device using a key rather than a block address. The value length of a KV pair data may vary between 1 byte to 4 GBs, where the value length may not match an optimized flash management unit (FMU) size. Thus, when the value length is very short, several values may be aggregated together in the same FMU or page of the memory device. However, the KV pair data or the aggregated pair data may not fill an FMU or page to capacity. When the KV pair data or the aggregated KV pair data is not aligned to an FMU or a page size, padding may be added to the FMU or the page to fill the FMU or the page to capacity. Likewise, KV pair data or the aggregated KV pair data may be split between multiple FMUs or pages. Thus, read performance may be impacted or valuable storage space may be utilized for padding, where the padding includes non-relevant data.

Therefore, there is a need in the art for an improved memory device storage utilization for KV data storage devices.

SUMMARY OF THE DISCLOSURE

The present disclosure generally relates to data storage devices, such as solid state drives (SSDs), and, more specifically, optimization of storage of data in key value (KV) data storage devices. A data storage device includes a memory device and a controller coupled to the memory device. The controller is configured to receive key value (KV) pair data from a host device, where the KV pair data includes a key and a value, store the received KV pair data in an intermediate storage location, match the received KV pair data to another one or more KV pair data stored in the intermediate storage location, where the matching is based on a utilization parameter of a storage container of the memory device, aggregate the matched received KV pair data and the another one or more KV pair data stored in the intermediate storage location, and program the aggregated KV pair data to the memory device.

In one embodiment, a data storage device includes a memory device and a controller coupled to the memory device. The controller is configured to receive key value (KV) pair data from a host device, where the KV pair data includes a key and a value, store the received KV pair data in an intermediate storage location, match the received KV pair data to another one or more KV pair data stored in the intermediate storage location, where the matching is based on a utilization parameter of a storage container of the memory device, aggregate the matched received KV pair data and the another one or more KV pair data stored in the intermediate storage location, and program the aggregated KV pair data to the memory device.

In another embodiment, a data storage device includes a memory device and a controller coupled to the memory device. The controller is configured to analyze a plurality of key value (KV) formats present in the data storage device, generate a grouping of two or more KV formats based on the analyzing, where the generating associates a first KV format with one or more second KV formats, and where the generated grouping is based on reaching at least a utilization parameter of a storage container of the memory device based on the grouping, and store the generated grouping for use by the controller to group two or more KV pair data received from a host device.

In another embodiment, a data storage device includes memory means and a controller coupled to the memory means. The controller is configured to store received key value (KV) pair data in a first location of the memory means, aggregate a first KV pair data associated with a first KV format with a second KV pair data associated with a second KV format, where the first KV format and the second KV format are distinct, and where the aggregating is to at least a utilization parameter of a second location of the memory means, and program the aggregated KV pair data to the second location of the memory means when the utilization parameter of the second location is reached or exceeded.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is an exemplary illustration showing storage of a plurality of KV pair data having either a first type or a second type using the conventional method of FIG. 3, according to certain embodiments.

FIG. 7 is an exemplary illustration showing storage of a plurality of KV pair data having either a first type or a second type using method of FIG. 5 and method of FIG. 6, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, optimization of storage of data in key value (KV) data storage devices. A data storage device includes a memory device and a controller coupled to the memory device. The controller is configured to receive key value (KV) pair data from a host device, where the KV pair data includes a key and a value, store the received KV pair data in an intermediate storage location, match the received KV pair data to another one or more KV pair data stored in the intermediate storage location, where the matching is based on a utilization parameter of a storage container of the memory device, aggregate the matched received KV pair data and the another one or more KV pair data stored in the intermediate storage location, and program the aggregated KV pair data to the memory device.

Figure 1:
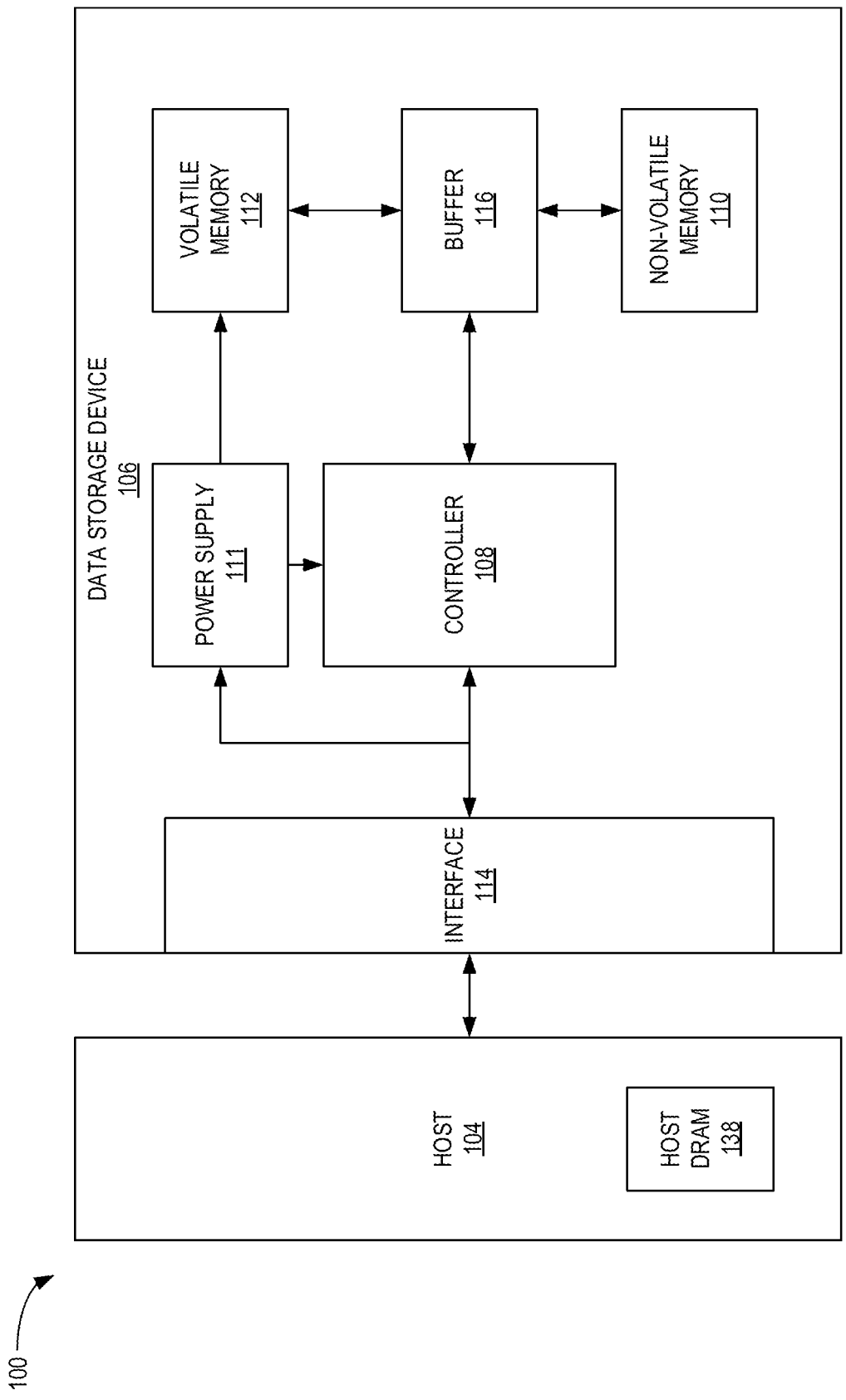
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory 150), which may be SRAM memory, prior to sending the data to the NVM 110.

Figure 2B:
FIG. 2B is a table illustrating a command set for a KV database, according to certain embodiments.
Figure 2A:
FIG. 2A is an exemplary illustration of a KV pair data, according to certain embodiments.

FIG. 2A is an exemplary illustration of a KV pair data 200, according to certain embodiments. KV pair data 200 includes a key 202 and a value 204, where the data, which may be host data, of the value 204 is addressed by the key 202. The key 202 may have a size of about 1 byte to about 64 bytes and the value 204 may have a size of about 0 bytes to about $2^{32}$-1 bytes. For example, when the value 204 has a size of about 0 bytes, the value 204 is an empty value. It is to be understood that the previously mentioned values are not intended to be limiting, but to provide an example of an embodiment.

FIG. 2B is a table 250 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 202 and value 204 associated with the key 202. The list command may cause the controller 108 to list keys that exist in a KV namespace starting at a specified key. The exist command may cause the controller 108 to return a status indicating whether a KV pair data 200 exists for a specified key to the command generator, such as the host device 104. The store command may cause the controller 108 to store a KV pair data to a KV namespace.

The retrieve command may cause the controller 108 to retrieve the value 204 associated with a specified key from a KV namespace. The length to be retrieved of the KV pair data 200 is specified in the retrieve command and the location to transfer the KV pair data 200 is specified by either a scatter gather list (SGL) pointer or a physical region page (PRP) pointer in the retrieve command. If the specified length in the retrieve command is less than the length of the KV pair data 200 that is being retrieved, then the controller 108 returns the requested amount and the length of the KV pair data 200 to the completion queue. However, if the specified length in the retrieve command is greater than the length of the KV pair data 200 that is being retrieved, then the controller 108 returns the data from the NVM 110 and the length of the KV pair data 200 is returned to the completion queue.

In the KV system, there may be one or more KV formats present, each with a different set of KV sizes and properties. For example, a KV format may refer to a value length of the KV data. The value length may correspond to a type of the host object. For example, large objects, such as large videos, data files, images, music, documents, and the like, may have a size of a few megabytes and smaller objects, such as leaves in larger data structures, log entries, social media applications, internet of things (IoT) services, and the like, may have a size in the tens of bytes. A flash management unit (FMU) size may be driven by different constraints according to the type and amount of error correction code (ECC) used and the physical memory parameters. A plurality of KV pair data that has a smaller value length, where the value length is less than an FMU size, may be grouped and aggregated to the FMU. For example, if a KV pair data has a value length of about 50 bytes and an FMU size is equal to about 4 KB, then about 80 KV pair data having a value length of about 50 bytes each may be stored in each FMU. Therefore, hundreds of KV pair data having a value length of about 50 bytes may be stored in each wordline.

Figure 3:
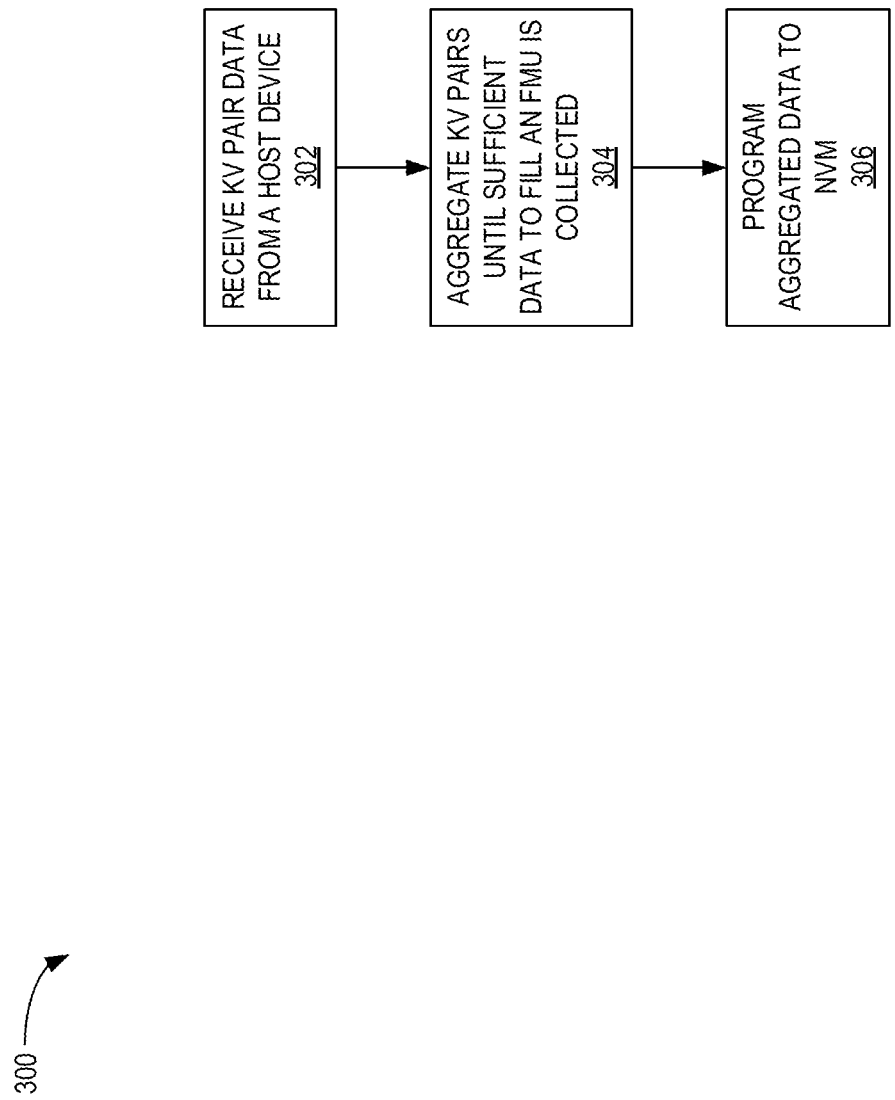
FIG. 3 is a flow diagram illustrating a conventional method of aggregating KV pair data to store in a storage container, according to certain embodiments.

FIG. 3 is a flow diagram illustrating a conventional method 300 of aggregating KV pair data to store in a storage container, according to certain embodiments. Conventional method 300 may be implemented by a controller, such as the controller 108 of FIG. 1. For exemplary purposes, aspects of the storage system 100 of FIG. 1 may be referenced herein. A storage container may be any relevant programming location of the data storage device 106, such as in the NVM 110. For example, a storage container may be an FMU, a wordline, a page, or the like. In other words, conventional method 300 may be used to aggregate KV pair data to fill an FMU, a wordline, a page, or any other relevant storage container. Conventional method 300 exemplifies aggregating KV pair data in an opportunistic manner, writing KV pair data in the order that the KV pair data, and programming padding data to fill a remaining capacity of a storage container (e.g., an FMU). Furthermore, the conventional method 300 may be directed towards writing data together that may be read together in order, such as in a sequential write/read operation. However, in KV data storage devices, KV data pairs may not be read sequential due to the KV system.

At block 302, the controller 108 receives KV pair data from the host device 104. At block 304, the controller 108 stores and aggregates KV pair data in a buffer, which may be the buffer 116, the volatile memory 112, SLC memory, or an internal volatile memory of the controller 108. The aggregating may be completed in an opportunistic manner, such that KV pair data that arrived adjacently in time are aggregated together up to a relevant storage container size, such as an FMU size. At block 306, the aggregated KV pair data is programmed to the relevant storage container of the NVM 110. However, because the aggregated KV pair data may not be aligned to the relevant storage container, padding may be added to the storage container to fill the remaining capacity or a value of the KV pair data may be split between two storage containers.

FIG. 4 is an exemplary illustration showing storage of a plurality of KV pair data 404-410 having either a first type ("A") or a second type ("B") using the conventional method 300 of FIG. 3, according to certain embodiments. In the current example, a plurality of KV pair data is received by a controller, such as the controller 108 of FIG. 1, from a host device, such as the host device 104 of FIG. 1, in the following order: 1) Value type A (1) 404; 2) Value type A (2) 406; 3) Value type B (1) 408; 4) Value type B (2) 410. Each of the received plurality of KV pair 404-410 data is less than an FMU size. Furthermore, the type refers to a KV format.

When Value type A (1) 404 is received, the value is programmed to a first FMU 402a. However, because the size of Value type A (1) 404 fills most, but not of the first FMU 402a, padding 412 is used to fill a remaining capacity of the first FMU 402a. When Value type A (2) 406 is received, the value is programmed to a second FMU 402b. However, because the size of Value type A (2) 406 fills most, but not of the second FMU 402b, padding 412 is used to fill a remaining capacity of the second FMU 402b. When Value type B (1) 408 is received, the controller 108 may store Value type B (1) 408 in a buffer since the size of Value type B (1) 408 is much less than the size of the FMU. When Value type B (2) 410 is received, the controller 108 may store Value type B (2) 410 in a buffer since the size of Value type B (2) 410 is much less than the size of the FMU. Thus, the controller 108 may then aggregate Value type B (1) 408 and Value type B (2) 410 and program the aggregated value to a third FMU 402c, where padding 412 is used to fill a remaining capacity of the third FMU 402c.

Figure 5:
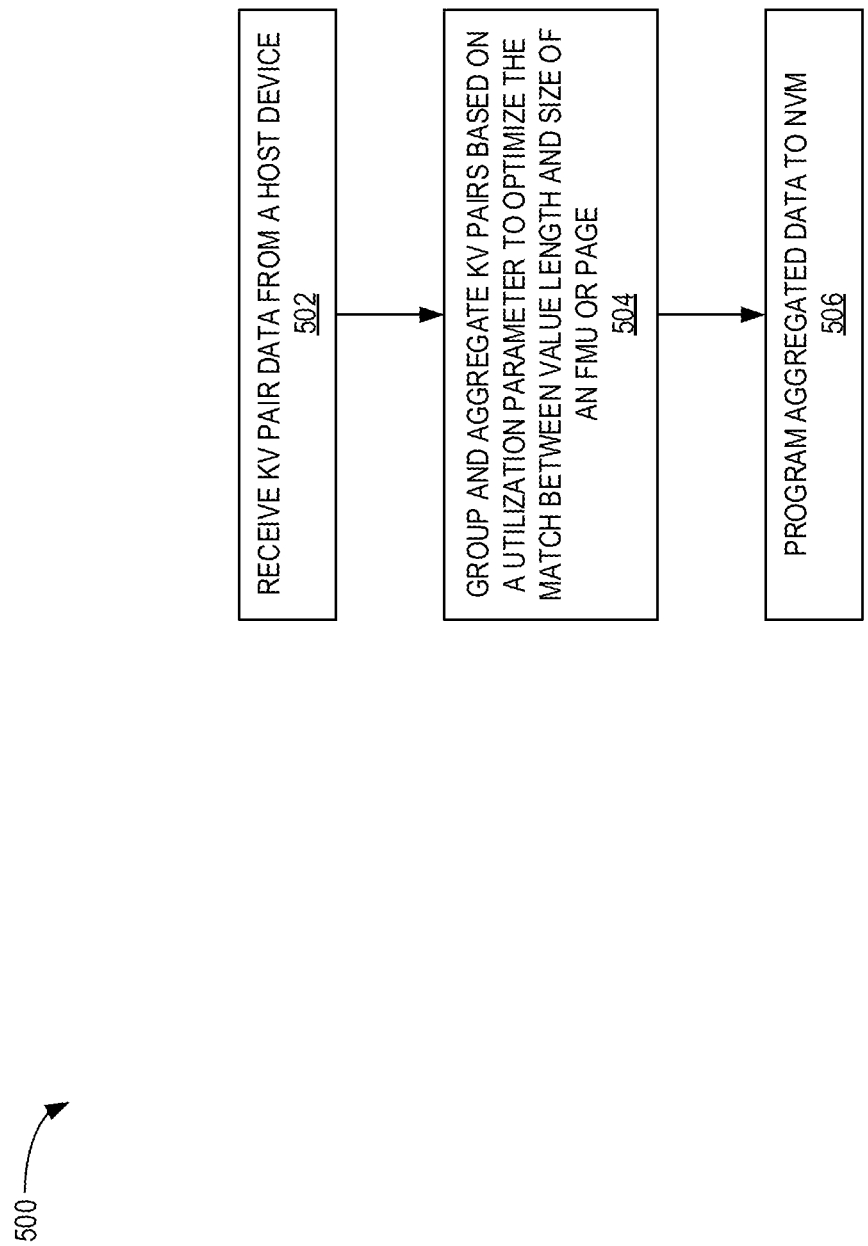
FIG. 5 is a flow diagram illustrating a method of aggregating KV pair data to store in a storage container, according to certain embodiments.

FIG. 5 is a flow diagram illustrating a method 500 of aggregating KV pair data to store in a storage container, according to certain embodiments. Method 500 may be implemented by a controller, such as the controller 108 of FIG. 1. For exemplary purposes, aspects of the storage system 100 of FIG. 1 may be referenced herein. A storage container may be any relevant programming location of the data storage device 106, such as in the NVM 110. For example, a storage container may be an FMU, a wordline, a page, or the like. In other words, method 500 may be used to optimize aggregating KV pair data to fill an FMU, a wordline, a page, or any other relevant storage container. Because KV formats are known by the data storage device 106 (i.e., a value length corresponding to different objects), the controller 108 may aggregate KV pair data (i.e., the values of the KV pair data) of one KV format with another one or more KV pair data (i.e., the values of the another one or more KV pair data) of another one or more KV formats in order to maximize utilization of the relevant storage container.

At block 502, the controller 108 receives KV pair data from the host device 104. At block 504, the controller 108 stores and aggregates KV pair data in a buffer, which may be the buffer 116, the volatile memory 112, SLC memory, hybrid memory, or an internal volatile memory of the controller 108. The aggregating may be based on a utilization parameter to optimize a match between KV pair data of different KV formats, where the match is based on a value length of the KV pair data of a certain format and a size of a relevant storage container, such as an FMU or a page. At block 506, the aggregated KV pair data is programmed to the relevant storage container of the NVM 110.

Figure 6:
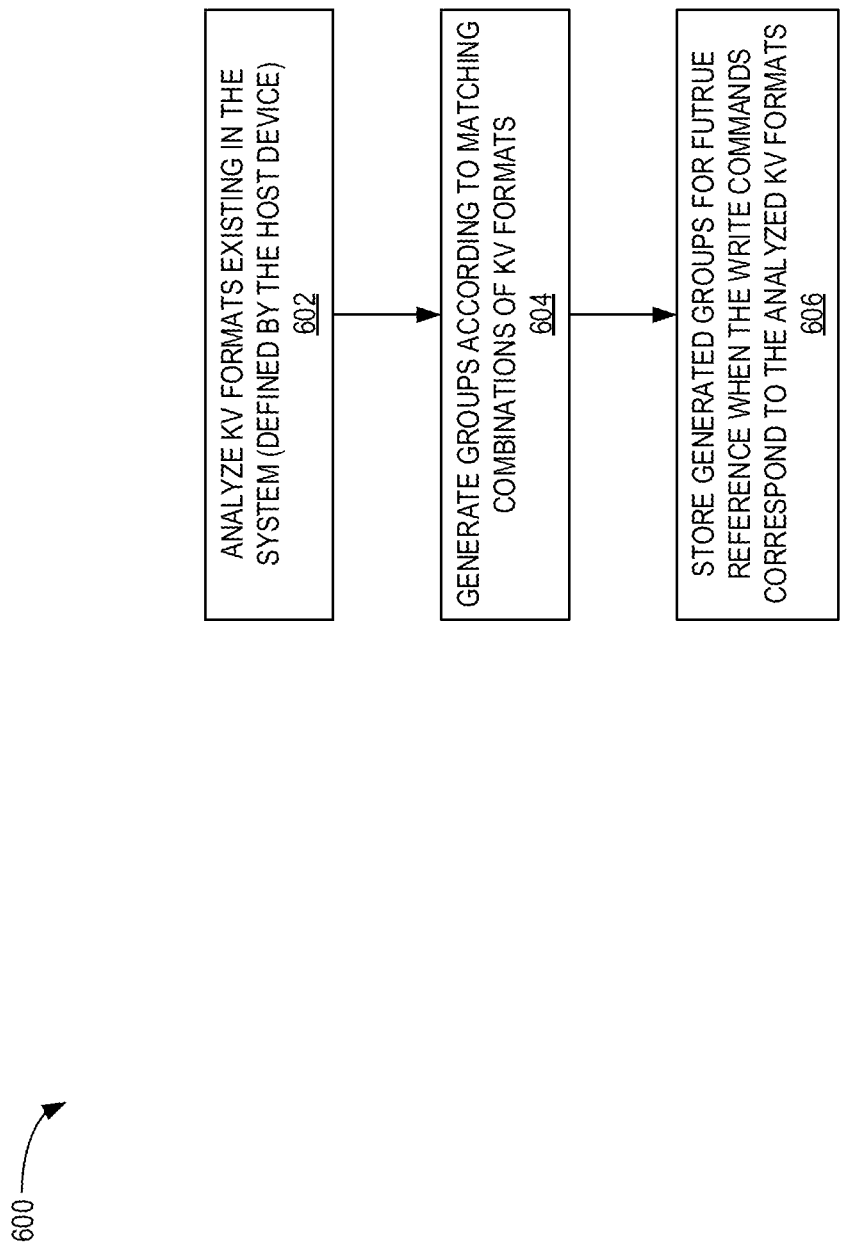
FIG. 6 is a flow diagram illustrating a method of grouping KV formats, according to certain embodiments.

FIG. 6 is a flow diagram illustrating a method 600 of grouping KV formats, according to certain embodiments. Method 600 may be implemented by a controller, such as the controller 108 of FIG. 1. For exemplary purposes, aspects of the storage system 100 of FIG. 1 may be referenced herein. A storage container may be any relevant programming location of the data storage device 106, such as in the NVM 110. For example, a storage container may be an FMU, a wordline, a page, or the like. In other words, method 600 may be used to optimize aggregating KV pair data to fill an FMU, a wordline, a page, or any other relevant storage container. Because KV formats are known by the data storage device 106 (i.e., a value length corresponding to different objects), the controller 108 may aggregate KV pair data (i.e., the values of the KV pair data) of one KV format with another one or more KV pair data (i.e., the values of the another one or more KV pair data) of another one or more KV formats in order to maximize utilization of the relevant storage container.

At block 602, the controller 108 analyzes the KV formats present in the data storage device 106, where the KV formats are defined by the host device 104. The defining may be based on a hint or length of the value associated with the KV pair data present in the data storage device 106. At block 604, the controller 108 generates groups according to matching combinations of KV formats (e.g., based on a utilization parameter). At block 606, the controller 108 stores the generated groups for future reference when the host device 104 writes using corresponding formats stored in the generated groups.

Furthermore, because the lengths of KV pair data are known in advance before data is passed from the host device 104 to the controller 108, the optimal match between KV pair data based on the grouping of KV formats may be calculated any time a KV format is added or removed. If the number of the KV formats is large or the sizes associated with the KV formats are unknown, the data sizes may be quantized to several bins, where the matching algorithm may be used on the several bins. The quantization boundaries will determine the tradeoff between utilization gain and complexity. In other words, if the data is finely quantized, the matching may become less complicated, but the utilization may be less optimal.

In another embodiment, received KV pair data may be stored in volatile memory, such as the buffer 116, the volatile memory 112, or an internal volatile memory of the controller 108. The stored KV pair data may be dynamically matched, such that if a group of KV pair data (i.e., two or more KV pair data of two or more KV formats) reaches a utilization parameter of a relevant storage container, then the group of KV pair data is aggregated and stored in the NVM 110. The utilization parameter may be between about 90% and about 100%. It is to be understood that the previously mentioned value is not intended to be limiting, but to provide an example of a possible embodiment. The aggregating may done by storing the value lengths of a plurality of KV pair data and a summation of KV pair data groupings, where the summation does not exceed the size of a storage container, and checking the summation if the KV pair data grouping reaches the utilization parameter. When the summation reaches the utilization parameter, then the KV pair data grouping is programmed to the NVM. The utilization parameter may be dynamic such that when the volatile memory storing the KV pair data to be grouped and aggregated is close to being filled (e.g., greater than about 50% usage), the utilization parameter may be closer to a lower bound of the utilization parameter minimum percentage (e.g., closer to 90%). Likewise, when the volatile memory storing the KV pair data to be grouped and aggregated is not close to being filled (e.g., less than about 50% usage), the utilization parameter may be closer to an upper bound of the utilization parameter minimum percentage (e.g., closer to 100%).

In yet another example, the controller 108 may determine which groups to program to the NVM 110 and which groups to keep in the volatile memory storing the KV pair data. Because the available of data from various KV formats may be limiting, some group options may be less appear less frequent, which may increase volatile memory usage while the KV pairs waits for a group member to satisfy the utilization parameter. The grouping options may be held and sorted by their utilization, where a sorted list of the groups may be stored in volatile memory. When the volatile memory is filled, the group with the highest utilization format based on the sorting may be programmed to the NVM 110. Likewise, the groups may be sorted by a number of group members present in the group. When the volatile memory is filled, the group with the lowest number may be programmed to the NVM 110. Furthermore, the groups may be sorted by how common or rare a certain KV format is. For example, higher priority to be programmed to the NVM 110 when the volatile memory is filled may be given to groups that have common KV formats and lower priority to be programmed to the NVM 110 when the volatile memory is filled may be given to groups that have rare KV formats.

FIG. 7 is an exemplary illustration showing storage of a plurality of KV pair data 704-710 having either a first type ("A") or a second type ("B") using method 500 of FIG. 5, according to certain embodiments. In the current example, a plurality of KV pair data is received by a controller, such as the controller 108 of FIG. 1, from a host device, such as the host device 104 of FIG. 1, in the following order: 1) Value type A (1) 704; 2) Value type A (2) 706; 3) Value type B (1) 708; 4) Value type B (2) 710. Each of the received plurality of KV pair 704-710 data is less than an FMU size. Furthermore, the type refers to a KV format.

When Value type A (1) 704 is received, the value is stored in volatile memory. When Value type A (2) 706 is received, the value is stored in volatile memory. When Value type B (1) 708 is received, the value is stored in volatile memory. When Value type B (2) 710 is received, the value is stored in volatile memory. Thus, the controller 108 may then aggregate Value type A (1) 704 with Value type B (1) 708 and store the aggregated value to a first FMU 702a. Likewise, the controller may then aggregate Value type A (2) 706 with Value type B (2) 710 and store the aggregated value to a second FMU 702b. The aggregating and programming may occur dynamically such that when the utilization parameter is met or exceeded, the relevant grouped/aggregated KV pair data is programmed to the NVM. In contrast to FIG. 3, the amount of padding needed may be minimal to none based on the utilization parameter of the aggregating and grouping, thus, optimization utilization of the storage space.

By generating groupings based on matching KV formats and grouping two or more KV pair data by their KV formats, the storage space utilization of the data storage device may be improved.

In one embodiment, a data storage device includes a memory device and a controller coupled to the memory device. The controller is configured to receive key value (KV) pair data from a host device, where the KV pair data includes a key and a value, store the received KV pair data in an intermediate storage location, match the received KV pair data to another one or more KV pair data stored in the intermediate storage location, where the matching is based on a utilization parameter of a storage container of the memory device, aggregate the matched received KV pair data and the another one or more KV pair data stored in the intermediate storage location, and program the aggregated KV pair data to the memory device.

The intermediate storage location is random access memory. The intermediate storage location is single level cell (SLC) memory or hybrid block memory. The utilization parameter is a minimum percentage of data to be stored in the storage container of the memory device. The aggregating is to at least the minimum percentage. The minimum percentage usage is between about 90% and about 100%. The minimum percentage usage is adjusted based on a fullness of the intermediate storage location. The minimum percentage usage is decreased when the fullness of the intermediate storage location increases. The minimum percentage usage is increased when the fullness of the intermediate storage location decreases. The matching includes grouping KV pair data of a first KV format with KV pair data of a second KV format. The matching further comprises analyzing a plurality of KV formats in the data storage device. The analyzing occurs when a KV format is added to the plurality of KV formats or removed from the plurality of KV formats.

In another embodiment, a data storage device includes a memory device and a controller coupled to the memory device. The controller is configured to analyze a plurality of key value (KV) formats present in the data storage device, generate a grouping of two or more KV formats based on the analyzing, where the generating associates a first KV format with one or more second KV formats, and where the generated grouping is based on reaching at least a utilization parameter of a storage container of the memory device based on the grouping, and store the generated grouping for use by the controller to group two or more KV pair data received from a host device.

Each KV format is defined by a host device. A KV format is a length of a value of a KV pair data. Generating the grouping is based on a tradeoff between the utilization parameter of the storage container and a complexity of a KV format. The controller is further configured to maintain a list of generated groupings. The list of generated groupings includes at least a first generated grouping and a second generated grouping, sort the list of generated groupings. The first generated grouping is a first listing and the second generated grouping is a second listing in the list of generated groupings, and program KV pair data associated with a first generated grouping of the sorted list of generated groupings to the memory device. The programming is in response to a threshold capacity of the memory device storing a plurality of KV pair data being reached. The sorting is based on the utilization parameter. The KV pair data associated with the first generated grouping is programmed prior to programming KV pair data associated with the second generated grouping. The utilization parameter of the first generated grouping is greater than the utilization parameter of the second generated grouping. The sorting is based on a number of group members of each of the generated groupings. The KV pair data associated with the first generated grouping is programmed prior to programming KV pair data associated with the second generated grouping. The number of group members of the first generated grouping is greater than the number of group members of the second generated grouping. The controller is further configured to store the KV pair data associated with the first generated grouping in single level cell (SLC) memory prior to programming the KV pair data to the memory device and store KV pair data associated with the second generated grouping in volatile memory.

In another embodiment, a data storage device includes memory means and a controller coupled to the memory means. The controller is configured to store received key value (KV) pair data in a first location of the memory means, aggregate a first KV pair data associated with a first KV format with a second KV pair data associated with a second KV format, where the first KV format and the second KV format are distinct, and where the aggregating is to at least a utilization parameter of a second location of the memory means, and program the aggregated KV pair data to the second location of the memory means when the utilization parameter of the second location is reached or exceeded. The first location and the second location are distinct.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive key value (KV) pair data from a host device, wherein the KV pair data includes a key and a value;
store the received KV pair data in an intermediate storage location;
match the received KV pair data to another one or more KV pair data stored in the intermediate storage location, wherein the matching is based on a utilization parameter of a storage container of the memory device;
aggregate the matched received KV pair data and the another one or more KV pair data stored in the intermediate storage location; and
program the aggregated KV pair data to the memory device.

2. The data storage device of claim 1, wherein the intermediate storage location is random access memory.

3. The data storage device of claim 1, wherein the intermediate storage location is single level cell (SLC) memory or hybrid block memory.

4. The data storage device of claim 1, wherein the utilization parameter is a minimum percentage of data to be stored in the storage container of the memory device.

5. The data storage device of claim 4, wherein the aggregating is to at least the minimum percentage.

6. The data storage device of claim 4, wherein the minimum percentage usage is between about 90% and about 100%.

7. The data storage device of claim 4, wherein the minimum percentage usage is adjusted based on a fullness of the intermediate storage location, wherein the minimum percentage usage is decreased when the fullness of the intermediate storage location increases, and wherein the minimum percentage usage is increased when the fullness of the intermediate storage location decreases.

8. The data storage device of claim 1, wherein the matching comprises grouping KV pair data of a first KV format with KV pair data of a second KV format.

9. The data storage device of claim 8, wherein the matching further comprises analyzing a plurality of KV formats in the data storage device, and wherein the analyzing occurs when a KV format is added to the plurality of KV formats or removed from the plurality of KV formats.

10. A data storage device, comprising:
a memory device; and
a controller coupled to the memory device, wherein the controller is configured to:
analyze a plurality of key value (KV) formats present in the data storage device;
generate a grouping of two or more KV formats based on the analyzing, wherein the generating associates a first KV format with one or more second KV formats, and wherein the generated grouping is based on reaching at least a utilization parameter of a storage container of the memory device based on the grouping; and store the generated grouping for use by the controller to group two or more KV pair data received from a host device.

11. The data storage device of claim 10, wherein each KV format is defined by the host device.

12. The data storage device of claim 11, wherein a KV format is a length of a value of a KV pair data.

13. The data storage device of claim 10, wherein generating the grouping is based on a tradeoff between the utilization parameter of the storage container and a complexity of a KV format.

14. The data storage device of claim 10, wherein the controller is further configured to:
   maintain a list of generated groupings, wherein the list of generated groupings includes at least a first generated grouping and a second generated grouping;
   sort the list of generated groupings, wherein the first generated grouping is a first listing and the second generated grouping is a second listing in the list of generated groupings; and
   program KV pair data associated with a first generated grouping of the sorted list of generated groupings to the memory device.

15. The data storage device of claim 14, wherein the programming is in response to a threshold capacity of the memory device storing a plurality of KV pair data being reached.

16. The data storage device of claim 14, wherein the sorting is based on the utilization parameter, wherein the KV pair data associated with the first generated grouping is programmed prior to programming KV pair data associated with the second generated grouping, and wherein the utilization parameter of the first generated grouping is greater than the utilization parameter of the second generated grouping.

17. The data storage device of claim 14, wherein the sorting is based on a number of group members of each of the generated groupings, wherein the KV pair data associated with the first generated grouping is programmed prior to programming KV pair data associated with the second generated grouping, and wherein the number of group members of the first generated grouping is greater than the number of group members of the second generated grouping.

18. The data storage device of claim 14, wherein the controller is further configured to:
   store the KV pair data associated with the first generated grouping in single level cell (SLC) memory prior to programming the KV pair data to the memory device; and
   store KV pair data associated with the second generated grouping in volatile memory.

19. A data storage device, comprising:
memory means; and
a controller coupled to the memory means, wherein the controller is configured to:
   store received key value (KV) pair data in a first location of the memory means;
   aggregate a first KV pair data associated with a first KV format with a second KV pair data associated with a second KV format, wherein the first KV format and the second KV format are distinct, and wherein the aggregating is to at least a utilization parameter of a second location of the memory means; and
   program the aggregated KV pair data to the second location of the memory means when the utilization parameter of the second location is reached or exceeded.

20. The data storage device of claim 19, wherein the first location and the second location are distinct.

* * * * *